H. P. MADISON.
SCREW PLATE.
APPLICATION FILED OCT. 20, 1911.
1,040,365.
Patented Oct. 8, 1912.
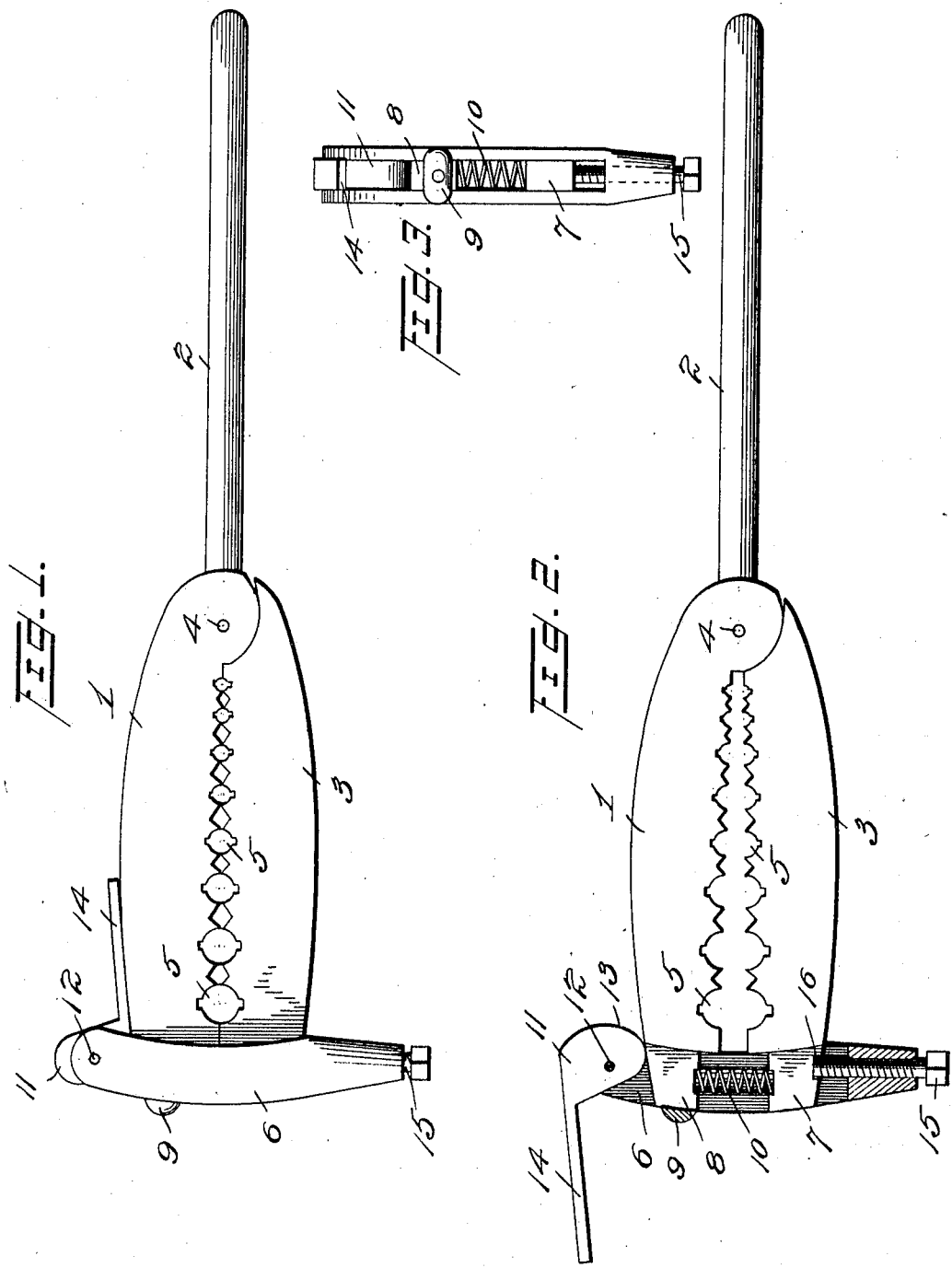
Witnesses
Inventor,
Hans P. Madison,
by
Attorney

UNITED STATES PATENT OFFICE.

HANS P. MADISON, OF FORT SMITH, ARKANSAS.

SCREW-PLATE.

1,040,365.

Specification of Letters Patent.

Patented Oct. 8, 1912.

Application filed October 20, 1911. Serial No. 655,756.

*To all whom it may concern:*

Be it known that I, HANS P. MADISON, a citizen of the United States of America, residing at Fort Smith, in the county of Sebastian and State of Arkansas, have invented certain new and useful Improvements in Screw-Plates, of which the following is a specification.

This invention relates to tools for threading bolts and one of the principal objects of the invention is to provide an efficient tool of simple construction which may be quickly used for forming threads upon standard sizes of bolts or for repairing the mutilated or injured threads of old bolts.

Another object of the invention is to provide a screw-threading tool in which threads may be cut on different sized bolts and in which the adjustments necessary can be quickly made for any required size of bolt without the insertion of separate dies.

These and other objects may be attained by means of the construction illustrated in the accompanying drawing, in which:—

Figure 1 is a plan view of the screw threading tool with the jaws closed and ready for operation upon bolts of different sizes; Fig. 2 is a view in plan and partial section of the tool with the jaws slightly separated and the cam lever for closing the jaws thrown upward to permit the jaws to separate; and Fig. 3 is an end view of the tool.

Referring to the drawing, the numeral 1 designates one of the jaws or members of the threading tool having a handle 2 integrally connected therewith and 3 is the pivoted member or jaw of the tool, said jaw being connected to the member 1 by means of a pin or pivot 4. In the members 1 and 3 are oppositely disposed graduated thread forming recesses 5. As shown, these recesses are for the standard size of bolt and any suitable number of these graduated recesses may be provided in the two members 1 and 3. The members 1 and 3 are at their outer ends connected together by a yoke or stirrup 6 comprising separated members through which the ends 7 and 8 of the members 1 and 3 extend. A keeper 9 may be connected to the end 8 of the member 1 for holding the stirrup or yoke in place. An eccentric lever 11 is pivoted at 12 between the separated members of the yoke, and a spiral spring 10 is placed between the ends 7 and 8 of the members 1 and 3 as shown in Fig. 2.

The lever 11 is provided with a cam surface 13 which bears upon the edge of the member 1 and when the handle 14 of said lever is thrown down upon the edge of the member 1, as shown in Fig. 1, the two members are closed together and held in this position for threading or repairing a bolt. When the handle 14 is thrown outward as shown in Fig. 2, the spring 10 is extended to slightly separate the members and to permit the bolt to be removed or placed in position for threading. To give a further range of adjustment of the recesses 5 for different sizes of bolts, I have provided a set screw 15 which extends through the yoke 6 and bears in a socket 16 formed in the end of the member 3, as shown in Fig. 2 of the drawing.

From the foregoing, it will be obvious that by the use of my threading tool, bolts of various sizes may be quickly threaded without requiring the insertion of separate dies and that bolts may be rethreaded or repaired quickly by means of my invention. My threading device has been found very efficient as a tool for the automobile tool box or for jobbers or repairers of automobiles and other similar vehicles and if found necessary a tapering thread may be formed on the ends of the bolts for ready connection of the nuts thereto.

I claim:

A tool for threading and rethreading bolts comprising a handle having a threading member rigidly connected, a pivoted member, said members being provided with screw threading recesses of varying sizes, a yoke spanning the ends of said members, an eccentric lever pivoted between the members of the yoke to bear upon the rigid threading member for closing the threading members together, a spring disposed between the ends of the threading members for separating the same, and a set screw mounted in the yoke for bearing against the pivoted threading member.

In testimony whereof I affix my signature in presence of two witnesses.

HANS P. MADISON.

Witnesses:
 MILES DICKINS,
 C. M. ROSS.